(12) United States Patent
Moriyama et al.

(10) Patent No.: US 11,981,262 B2
(45) Date of Patent: May 14, 2024

(54) DOOR MIRROR STRUCTURE

(71) Applicant: MAZDA MOTOR CORPORATION, Hiroshima (JP)

(72) Inventors: Yukihiro Moriyama, Hiroshima (JP); Atsushi Yakushinji, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 23 days.

(21) Appl. No.: 17/934,139

(22) Filed: Sep. 21, 2022

(65) Prior Publication Data
US 2023/0116537 A1    Apr. 13, 2023

(30) Foreign Application Priority Data

Oct. 13, 2021 (JP) .................................. 2021-168302

(51) Int. Cl.
*B60R 1/06* (2006.01)
*B60R 1/00* (2022.01)
*B60R 1/07* (2006.01)

(52) U.S. Cl.
CPC ................ *B60R 1/006* (2013.01); *B60R 1/07* (2013.01)

(58) Field of Classification Search
CPC ......... B60R 1/006; B60R 1/007; B60R 1/008; B60R 1/06; B60R 1/0607; B60R 1/0612; B60R 1/0617; B60R 1/07; B60R 1/072; B60R 1/074

See application file for complete search history.

(56) References Cited

U.S. PATENT DOCUMENTS

| 3,493,295 | A  | * | 2/1970  | Kobrehel ................ B60R 1/062 |
| | | | | 359/877 |
| 3,820,877 | A  | * | 6/1974  | Moyer .................... B60R 1/078 |
| | | | | 74/502.1 |
| 4,030,692 | A  | * | 6/1977  | Szilagyi .................... B60R 1/06 |
| | | | | 248/487 |
| 5,831,779 | A  | * | 11/1998 | Moore .................... B60R 1/078 |
| | | | | 359/878 |
| 10,780,829 | B2 | * | 9/2020  | Van Houten, II ....... B60R 1/074 |
| 10,889,172 | B2 | * | 1/2021  | Iwai ......................... B60J 10/86 |
| 11,458,894 | B2 | * | 10/2022 | Choi .................... B62D 65/024 |
| 2020/0164806 | A1 | * | 5/2020  | Salaam .................. B60R 1/006 |
| 2020/0339036 | A1 | | 10/2020 | Kenmochi et al. |

FOREIGN PATENT DOCUMENTS

JP         2020-179680 A    11/2020

* cited by examiner

*Primary Examiner* — Nkeisha Smith
(74) *Attorney, Agent, or Firm* — Studebaker & Brackett PC

(57) ABSTRACT

A door mirror structure reduces vehicle width when the mirror is retracted, prevents vibration of the mirror when the vehicle is traveling, and improves visibility from the vehicle interior. Embodiments include a door mirror body unit; and a mirror base having a tip portion fixed to the door mirror body unit and a base end portion away from the tip portion. The base end portion is attached to the side door so that the door mirror body unit and the mirror base are movable between a mirror use position at which the mirror is visible from a vehicle interior and a retraction position located on an inner side in a vehicle width direction of the mirror use position. A driving unit moves the door mirror body unit and the mirror base between the mirror use position and the retraction position. The driving unit is located in the side door.

11 Claims, 15 Drawing Sheets

DOOR MIRROR STRUCTURE

TECHNICAL FIELD

The present disclosure relates to a door mirror structure.

BACKGROUND

Of conventional door mirror structures, a door mirror structure having an electric pivoting unit, as described in Japanese patent document JP-A-2020-179680, for automatically moving the door mirror between a usable position and a retraction position is known.

This door mirror structure includes a door mirror body unit having a mirror, a mirror base projecting in the vehicle width direction from a side door, and the electric pivoting unit housed in the door mirror body unit. The mirror base is a portion that has a base end portion and a tip portion, extends in the vehicle width direction, and constitutes the arm portion of the door mirror. The base end portion of the mirror base is fixed to the side door, and the door mirror body unit is pivotally attached to the tip portion of the mirror base about a pivot shaft extending in the vertical direction.

The door mirror body unit is movable between the mirror use position and the retraction position by pivoting at the tip portion of the mirror base due to the rotational driving force of the electric pivoting unit housed in the door mirror body unit. The mirror use position is a position at which the door mirror body unit projects from the tip portion of the mirror base to the outside in the vehicle width direction and the mirror is visible from the vehicle interior. In contrast, the retraction position is a position at which the door mirror body unit extends substantially parallel to the side door.

SUMMARY

In the door mirror structure described above, the base end portion of the mirror base is fixed to the side door and the door mirror body unit pivots at the tip portion of the mirror base. Accordingly, in the case of a vehicle designed with a required length in the width direction of the mirror base, since the mirror base projects from the door panel even though the door mirror body unit moves to the retraction position when the mirror is retracted, demands to reduce the vehicle width when the mirror is retracted cannot be met sufficiently.

In addition, since the electric storage unit is housed in the door mirror body unit in the structure described above, the moment in the vertical direction generated at the position of the electric pivoting unit increases in proportion to the length of the mirror base, thereby causing a problem in that the vibration of the mirror during travel of the vehicle is large.

Furthermore, since the electric pivoting unit is housed in the door mirror body unit, the width in the front-rear direction (that is, the width in the vehicle front-rear direction) of the door mirror body unit is large, thereby raising a concern that the door mirror body unit will interfere with the visibility from the vehicle interior.

The present disclosure considers the circumstances described above to provide a door mirror structure that can satisfactorily achieve the reduction in the vehicle width when the mirror is retracted, the suppression of vibration of the mirror during a travel of the vehicle, and the improvement of the visibility from the vehicle interior.

To solve the problem described above, a door mirror structure according to the present disclosure is a door mirror structure in a side door of a vehicle, the door mirror structure including a door mirror body unit having a mirror for obtaining a field of rear view of the vehicle; a mirror base having a tip portion fixed to the door mirror body unit and a based end portion away from the tip portion, wherein the base end portion is attached to the side door so that the door mirror body unit and the mirror base are movable between a mirror use position at which the mirror is visible from a vehicle interior and a retraction position located on an inner side in a vehicle width direction of the mirror use position; and a driving unit that moves the door mirror body unit and the mirror base between the mirror use position and the retraction position, in which the driving unit is provided in the side door.

In this door mirror structure including the door mirror body unit having the mirror and the mirror base in which the door mirror body unit is fixed to the tip portion, the driving unit moves the door mirror body unit and the mirror base from the mirror use position to the retraction position.

Accordingly, when the door mirror body unit and the mirror base have been moved to the retraction position, the projection amount in the vehicle width direction of the door mirror body unit and the mirror base from the side surface of the side door is reduced and the vehicle width dimension is minimized.

In addition, since the driving unit, which is a heavy object, is provided in the side door in this door mirror structure, the moment in the vertical direction generated in the door mirror due to road input (that is, vibration and external force mainly in the vertical direction due to the unevenness of the road surface) during a travel of the vehicle is reduced and the vibration of the mirror is prevented.

Furthermore, since the driving unit is provided in the side door, the width in the front-rear direction of the door mirror body unit can be reduced as compared with the conventional door mirror structure in which the driving unit is housed in the door mirror body unit and the visibility from the vehicle interior can be improved.

In the door mirror structure described above, preferably, the driving unit is provided in the side door. This arrangement protects the driving unit from foreign matter outside the vehicle by the outer surface of the side door.

Preferably, the door mirror structure described above further includes a pivot shaft coupled to the base end portion of the mirror base, the pivot shaft pivotally supporting the door mirror body portion and the mirror base between the mirror use position and the retraction position, in which the pivot shaft extends from the base end portion into the side door, the pivot shaft being rotated by the driving unit.

Since this structure further includes the pivot shaft that pivotally supports the door mirror body unit and the mirror base, the door mirror body unit and the mirror base can be moved between the mirror use position and the retraction position by being pivoted about the pivot shaft as the pivot center by rotating the pivot shaft via the driving unit in the side door. Accordingly, the movement of the door mirror body unit and the mirror base between the mirror use position and the retraction position can be achieved with a simple structure.

In the door mirror structure described above, preferably, the driving unit is disposed on an axial line of the pivot shaft.

Since the driving unit is disposed on the axial line of the pivot shaft in this structure, the power transmission system from the driving unit to the pivot shaft can be simple and compact. This enables the driving unit to be installed in a limited space in the side door.

Preferably, the door mirror structure described above further includes a cover member that covers, from a vehicle outside, a clearance between the pivot shaft and a through-hole through which the pivot shaft passes, the through-hole being formed in a door panel constituting an outer surface of the side door.

Since the cover member covers the clearance between the through-hole of the door panel and the pivot shaft from the vehicle outside in this structure, the appearance of the vehicle is improved and intrusion of water into the door panel through the clearance can be prevented.

In the door mirror structure described above, preferably, the driving unit is fixed to a frame member that constitutes a frame of the side door, the frame member being provided in the side door.

Since the driving unit is fixed to the frame member that constitutes the frame of the side door in this structure, the support stiffness of the driving unit is improved.

In the door mirror structure described above, preferably, the frame member is a belt line reinforcement extending in the vehicle front-rear direction along a belt line at a lower edge of a window of the side door.

In this structure, by fixing the driving unit to the belt line reinforcement generally used for the conventional door structure, the door mirror structure described above can be widely adopted in the conventional door structure.

In the door mirror structure described above, preferably, the belt line reinforcement is formed by an extruded member made of aluminum.

Since the belt line reinforcement is formed by the extruded member made of aluminum in this structure, both an improvement in the support stiffness of the driving unit and a reduction in the weight of the vehicle can be achieved.

In the door mirror structure described above, when the door mirror body unit is at the mirror use position, in plan view, an inner surface of the door mirror body unit that faces the side door portion is inclined to the vehicle outside with respect to a virtual line that is orthogonal to a surface of the mirror and passes through an inner end portion of the door mirror body unit close to the side door.

Since the inner surface of the door mirror body unit that faces the side door is inclined to the vehicle outside with respect to the virtual line orthogonal to the surface of the mirror in this structure in plan view when the door mirror body unit is at the mirror use position, the inner surface of the door mirror body unit does not block the field of view from the vehicle interior. As a result, visibility from the vehicle interior can be ensured as much as possible to further improve the visibility.

In the door mirror structure described above, preferably, when the door mirror body unit is at the mirror use position, in plan view, a thickness in the front-rear direction of the door mirror body unit becomes smaller toward the inner end portion in the vehicle width direction from a middle position in the vehicle width direction in the door mirror body unit.

Since the thickness in the front-rear direction of the door mirror body unit becomes smaller toward the inner end portion in the vehicle width direction from the middle portion in the vehicle width direction when the door mirror body unit is at the mirror use position in this structure, the inner surface of the door mirror body portion does not block the field of view from the vehicle interior. As a result, the visibility from the vehicle interior can be ensured as much as possible to further improve the visibility.

The door mirror structure according to the present disclosure can satisfactorily achieve a reduction in vehicle width when the mirror is retracted, the prevention of vibration of the mirror during travel of the vehicle, and the improvement of visibility from the vehicle interior.

DETAILED DESCRIPTION

An embodiment of the present disclosure will be described with reference to the attached drawings.

Figure 1:
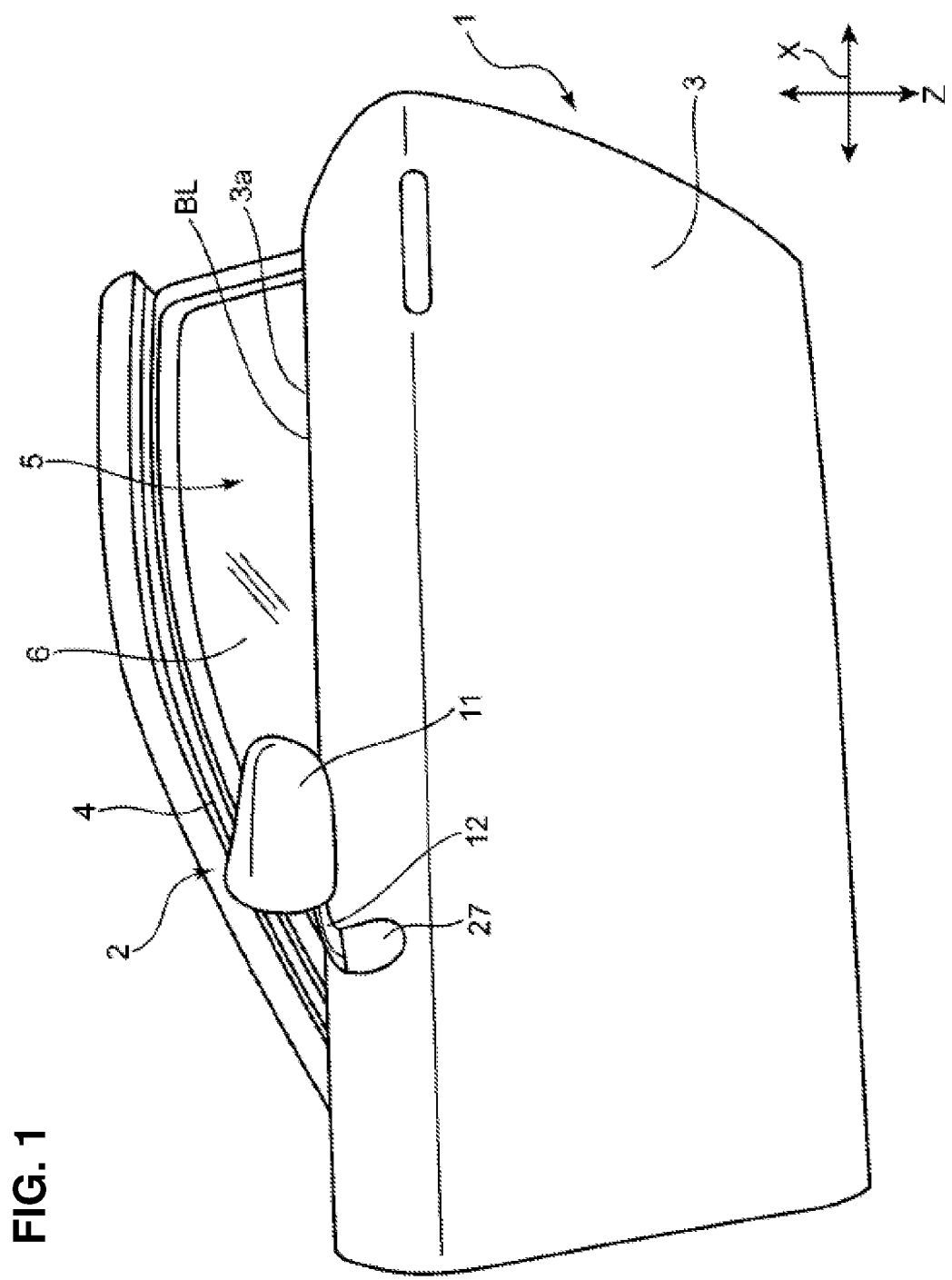
FIG. 1 is a perspective view illustrating the entire structure of a side door having a door mirror to which a door mirror structure according to an embodiment of the present disclosure has been applied.
Figure 2:
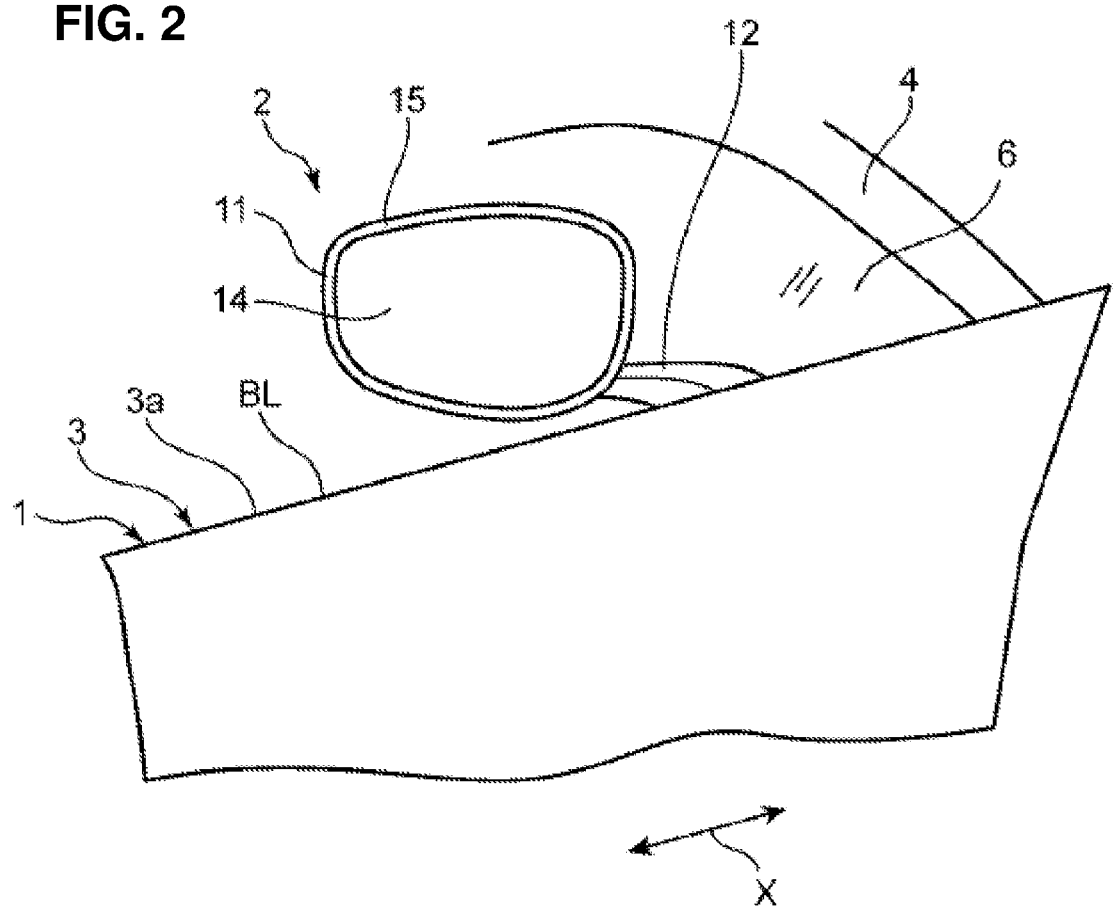
FIG. 2 is a diagram of the door mirror in FIG. 1 as seen from a vehicle interior.
Figure 3:
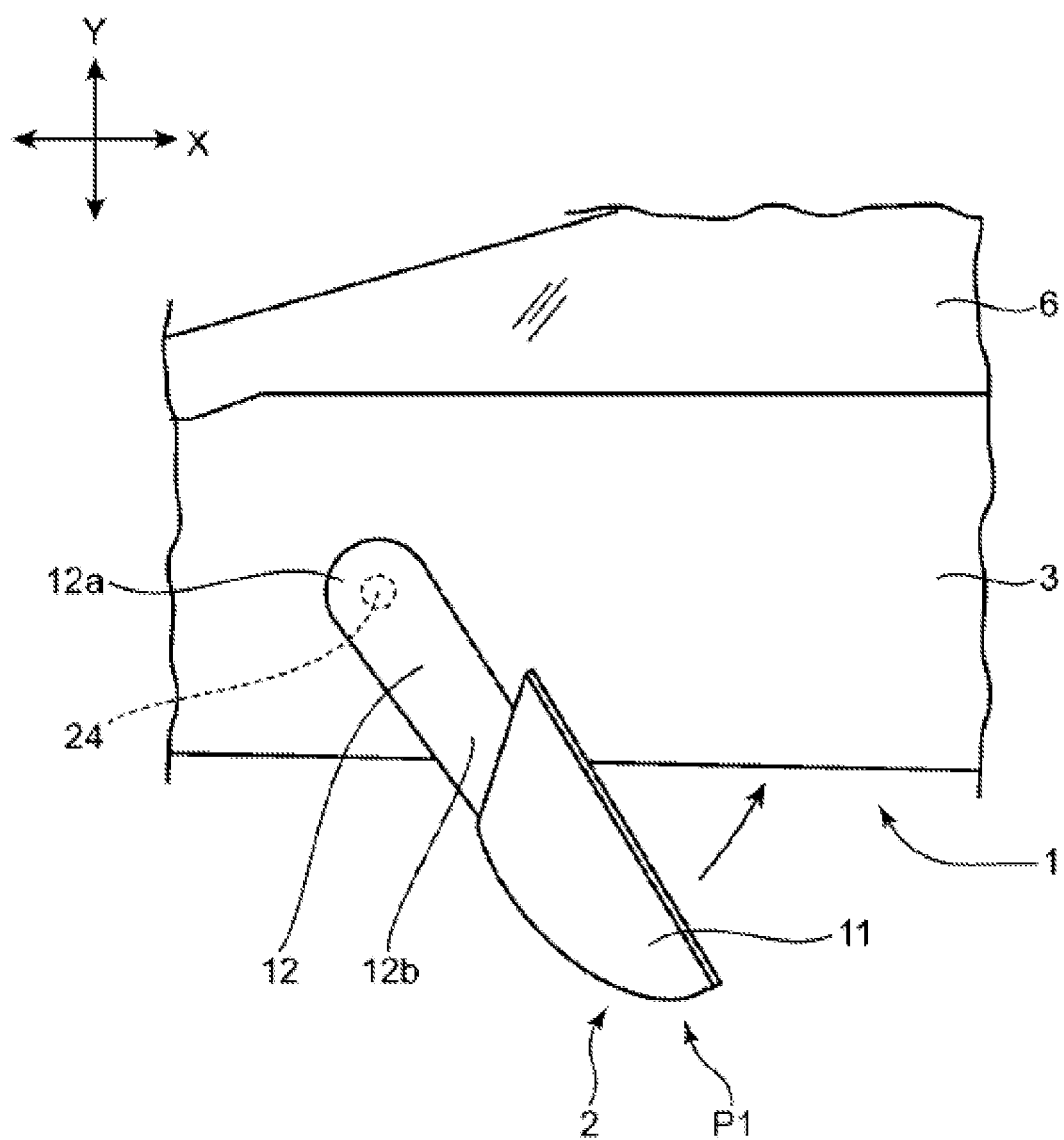
FIG. 3 is a plan view illustrating the state in which the door mirror in FIG. 1 is at a mirror use position.

FIGS. 1 and 2 illustrate a side door 1 of a vehicle to which a door mirror structure according to the present disclosure is applied. In this side door 1, a door mirror 2 is disposed near a belt line BL at an upper end 3a of a door panel 3 and on the vehicle rear side of an A pillar 4. A door glass 6 is disposed in a door opening 5 surrounded by the A pillar 4 and the belt line BL.

In the door mirror structure in the side door 1 of a vehicle according to the embodiment, the door mirror 2 that can be electrically retracted is attached to the side door 1, as illustrated in FIGS. 1 to 7. Specifically, the door mirror structure includes, as main units, a door mirror body unit 11 and a mirror base 12 that constitute the door mirror 2, and an electric pivoting unit 13 that is a driving unit for moving the door mirror body unit 11 and the mirror base 12. The electric pivoting unit 13 is disposed in the side door 1.

In addition, the door mirror structure according to the embodiment further includes a pivot shaft 24 (see FIGS. 11 and 12) that pivotally supports the door mirror body unit 11 and the mirror base 12, a belt line reinforcement 21 that is a frame member in the side door 1, a support member 22 that fixes the electric pivoting unit 13 to the belt line reinforcement 21, and a cover member 27 provided on the vehicle outside of the side door 1.

The components of the door mirror structure will be described below in sequence.

As illustrated in FIG. 2, the door mirror body unit 11 has a mirror 14 for obtaining the field of rear view of the vehicle and a housing 15. The mirror 14 is an optical mirror that reflects light and is held by the rear surface (specifically, the surface facing the rear side at the mirror use position P1 in FIG. 3) of the housing 15. In addition, the housing 15 of the door mirror body unit 11 houses internal devices 37 (see FIG. 12) such as a mirror surface adjustment unit for adjusting the angles of the mirror 14 in the vertical direction Z and the vehicle width direction Y or a defrosting unit of the mirror 14.

The mirror base 12 is a portion that constitutes an arm portion of the door mirror 2 and, as illustrated in FIGS. 3 to 6, has a tip portion 12*b* fixed to the door mirror body unit 11 and a base end portion 12*a* away from the tip portion 12*b*.

More specifically, the door mirror body unit 11 is fixed to the tip portion 12*b* of the mirror base 12 so that the mirror 14 and the mirror base 12 extend substantially parallel to each other.

The base end portion 12*a* of the mirror base 12 is attached to the side door 1 so that the door mirror body unit 11 and the mirror base 12 are movable between the mirror use position P1 at which the mirror 14 is visible from the vehicle interior and the retraction position P2 located on the inner side in the vehicle width direction Y of the vehicle use position P1.

Figure 4:
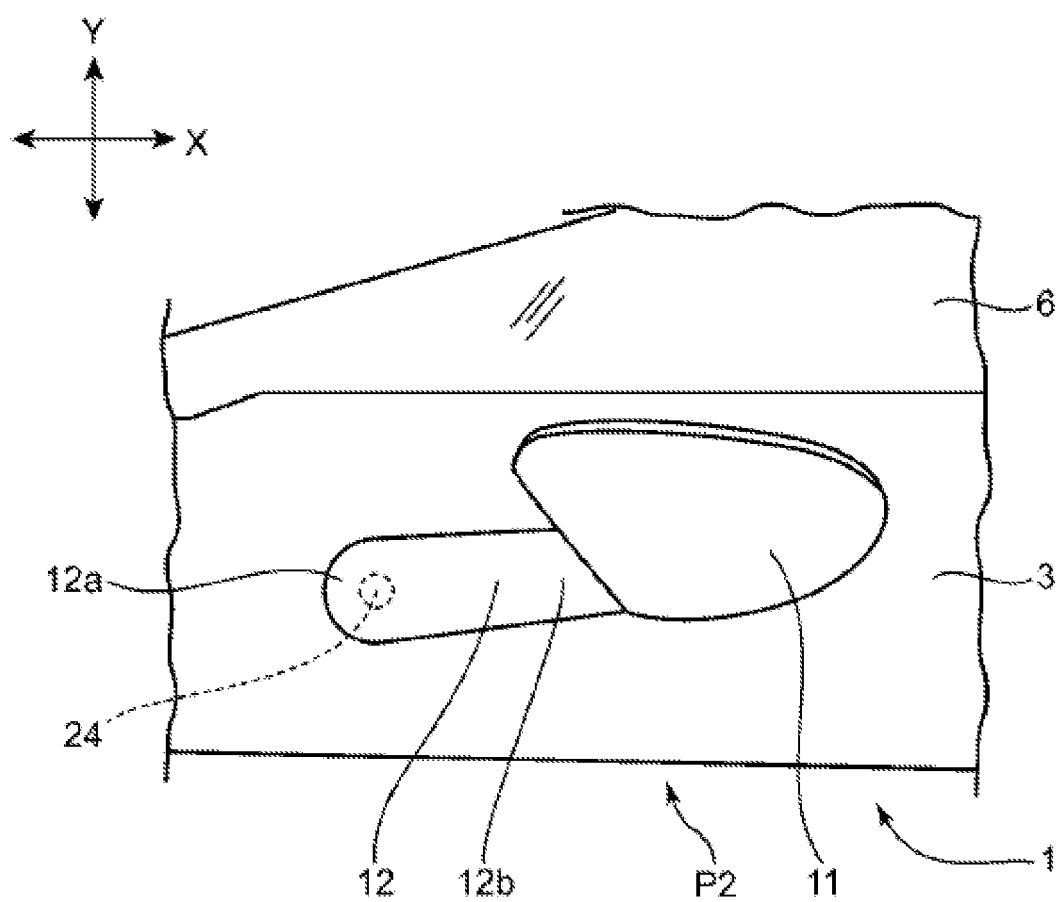
FIG. 4 is a plan view illustrating the state in which the door mirror in FIG. 1 is at a retraction position.
Figure 5:
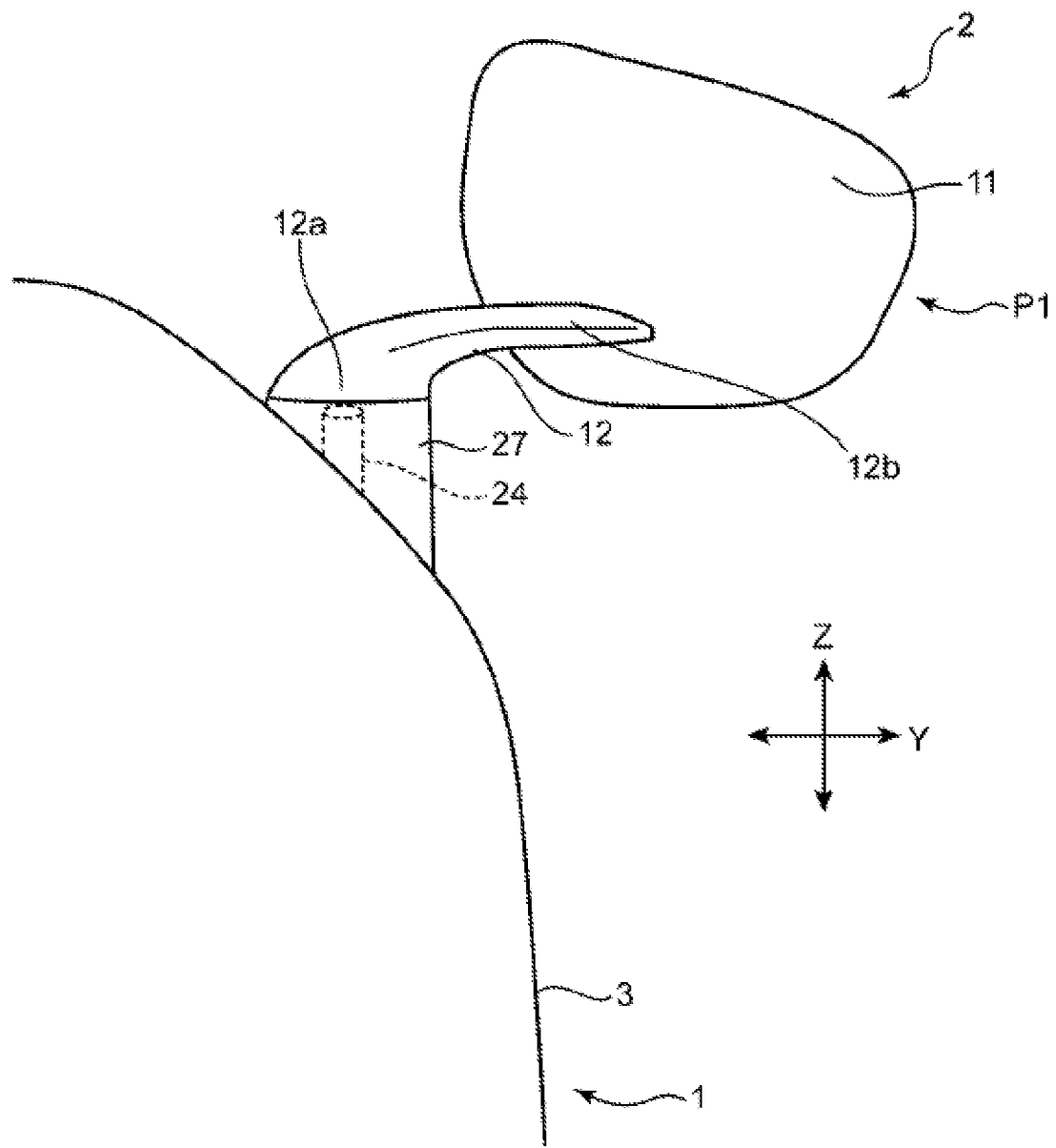
FIG. 5 is a diagram illustrating the state in which the door mirror in FIG. 1 is at the mirror use position, as seen from the vehicle front.
Figure 6:
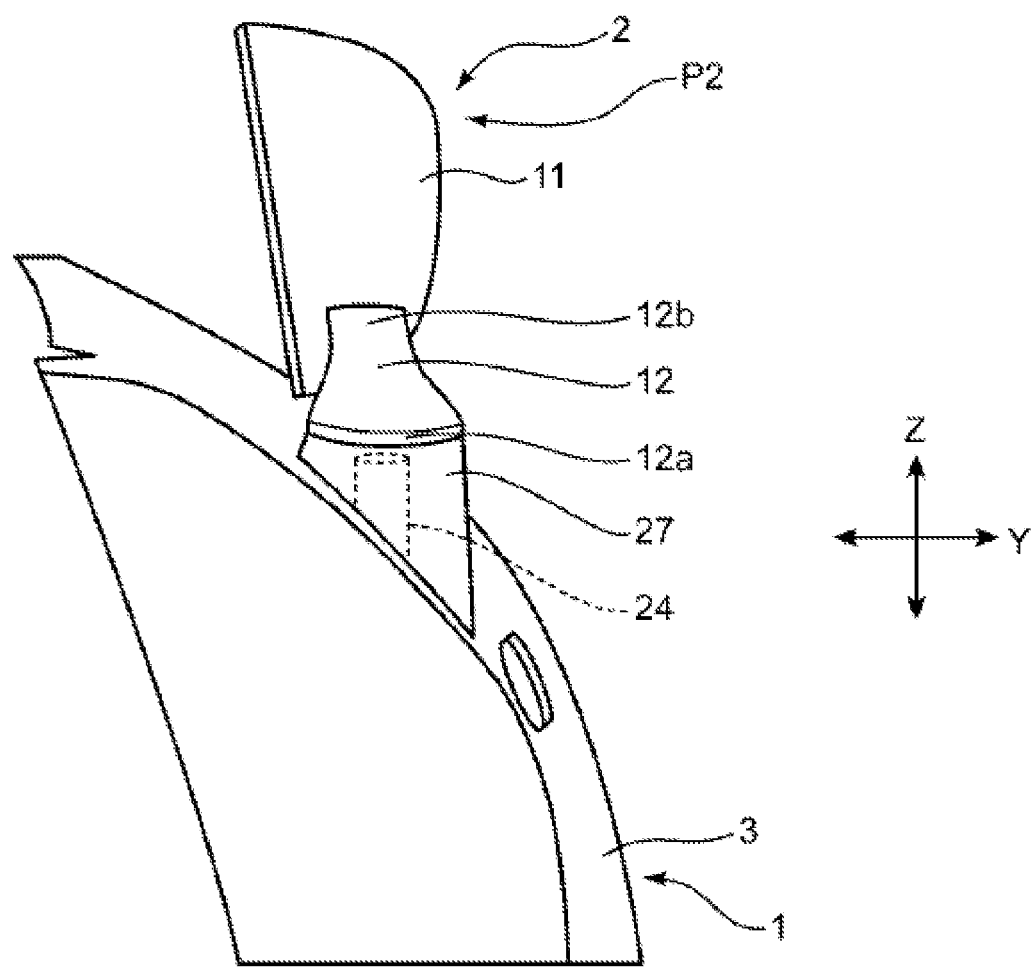
FIG. 6 is a diagram illustrating the state in which the door mirror in FIG. 1 is at the retraction position, as seen from the vehicle front.

In the embodiment, the pivot shaft 24 illustrated in FIGS. 9 to 12 is coupled to the base end portion 12*a* of the mirror base 12, and the door mirror body unit 11 and the mirror base 12 are pivotally supported by the pivot shaft 24 between the mirror use position P1 (see FIGS. 3 and 5) and the retraction position P2 (see FIGS. 4 and 6).

The pivot shaft 24 extends from the base end portion 12*a* into the side door 1 and is rotated by the electric pivoting unit 13.

Specifically, as illustrated in FIGS. 9 to 12, a through-hole 26 is formed in the door panel 3 (outer panel) that constitutes the outer surface of the side door 1. The pivot shaft 24 is coaxially coupled to the output shaft 35 (see FIG. 12) described later of the electric pivoting unit 13 provided in a space section 20 inside the side door 1 through the through-hole 26 of the door panel 3.

Figure 12:
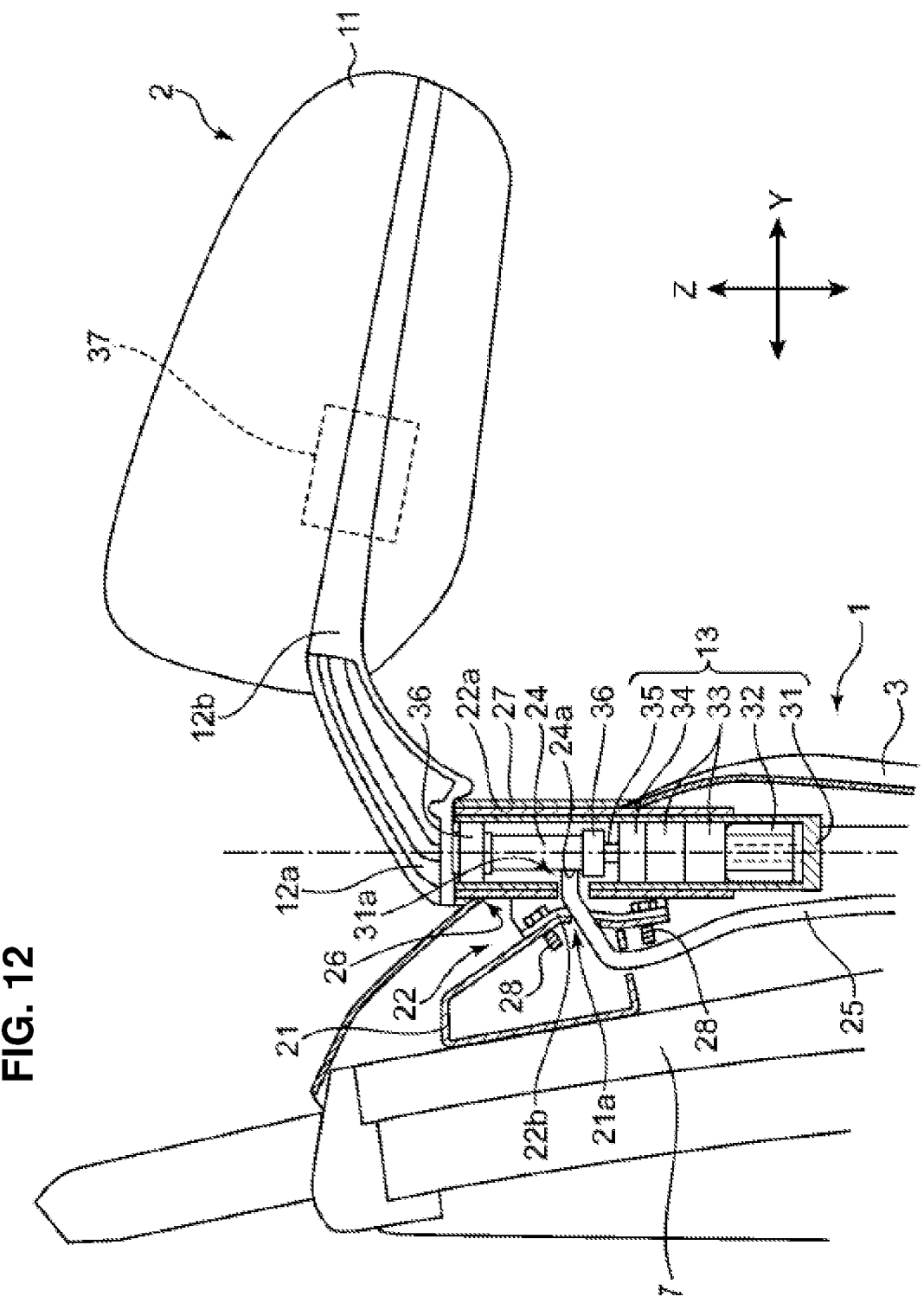
FIG. 12 is a diagram in which the cover member has been added to a sectional view taken along line XII-XII in FIG. 8.

The electric pivoting unit 13 has a structure in which the door mirror body unit 11 and the mirror base 12 are moved between the mirror use position P1 and the retraction position P2. Specifically, as illustrated in FIG. 12, the electric pivoting unit 13 includes a casing 31, a motor 32, a reducer 33 that reduces the torque generated by the motor 32, a torque limiter 34, and the output shaft 35 that outputs a rotational driving force. The casing 31 houses the motor 32, the reducer 33, the torque limiter 34, and the output shaft 35 described above. In addition, the casing 31 also houses the pivot shaft 24 and a bearing 36 that rotatably supports the pivot shaft 24. Accordingly, the motor 32, the reducer 33, the torque limiter 34, and the output shaft 35, which are the main components of the electric pivoting unit 13, are disposed on the axial line of the pivot shaft 24. The output shaft 35 is coupled to the pivot shaft 24 in an integrally rotatable manner.

It should be noted that, when excessive torque is generated on the pivot shaft 24 when the motor 32 operates, the torque limiter 34 can suppress loads on the motor 32 by cutting off the transmission of the torque.

The bearing 36 is preferably a ball bearing or a roller bearing that supports the pivot shaft 24 with a small rotational resistance.

The electric pivoting unit 13 is fixed to the belt line reinforcement 21 via the support member 22.

Figure 7:
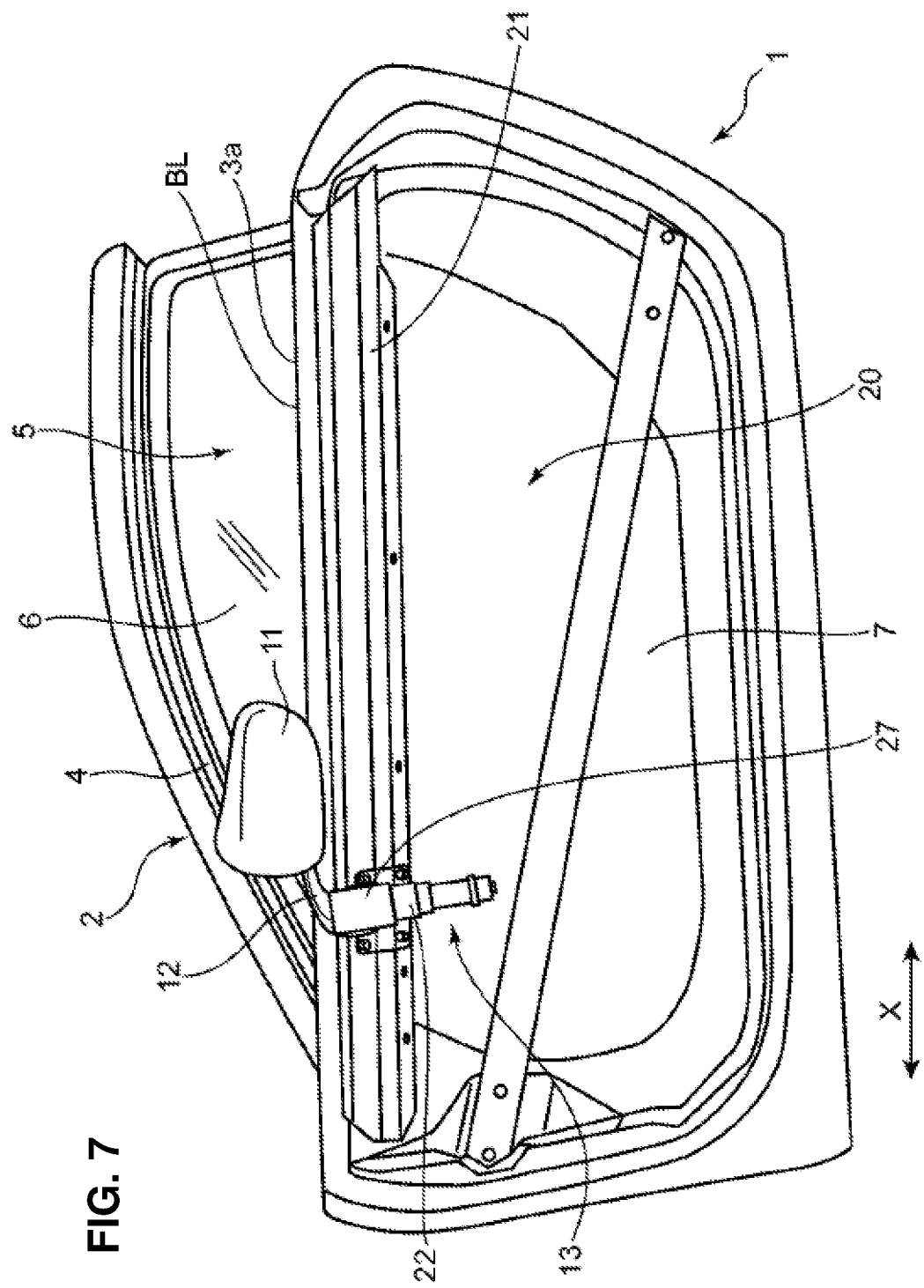
FIG. 7 is a diagram illustrating the state in which a belt line reinforcement in the side door has been exposed by removal of a door outer from the side door in FIG. 1.
Figure 8:
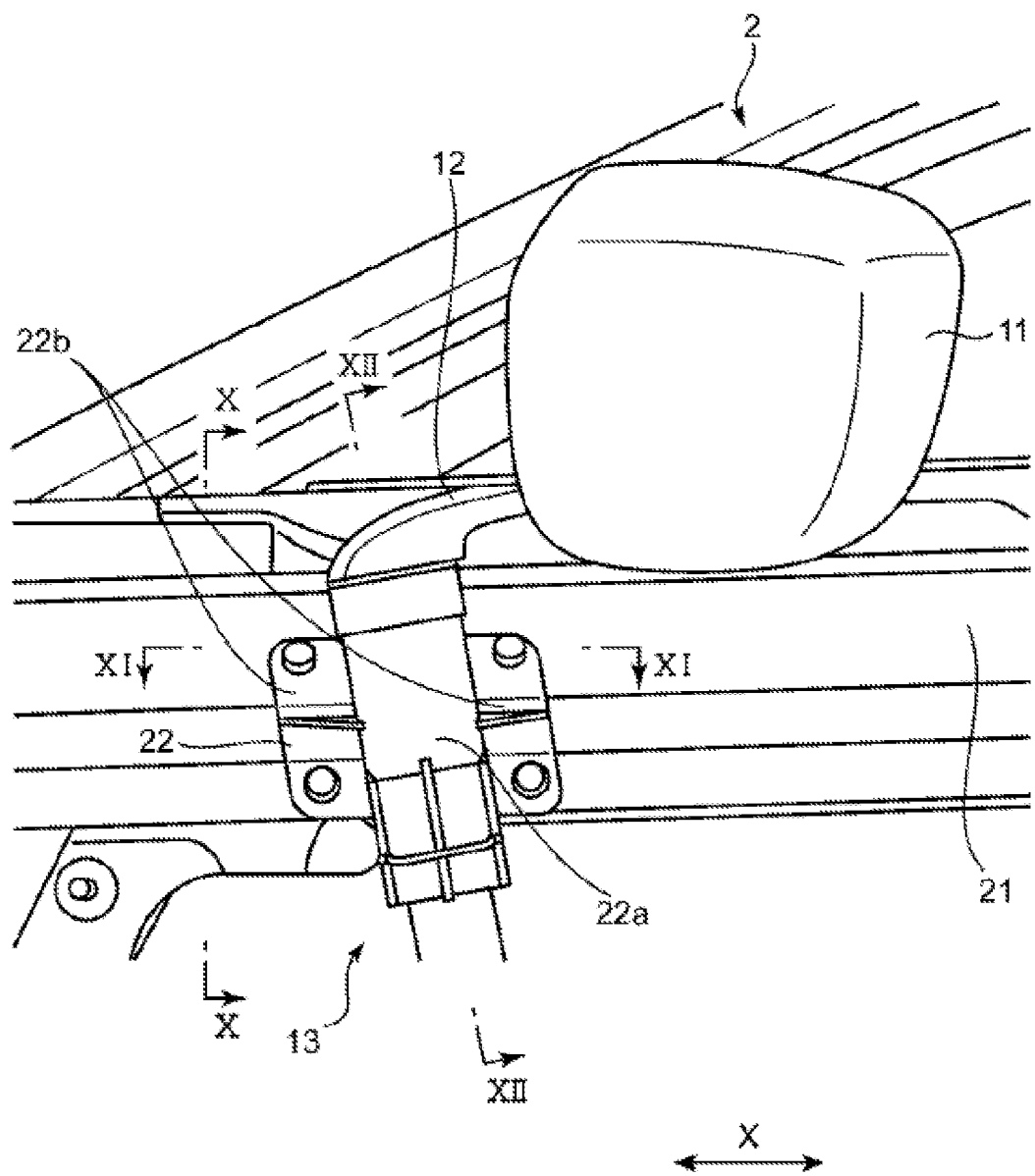
FIG. 8 is an enlarged view illustrating the state in which the door mirror and an electric pivoting unit are fixed to the belt line reinforcement in FIG. 7.
Figure 9:
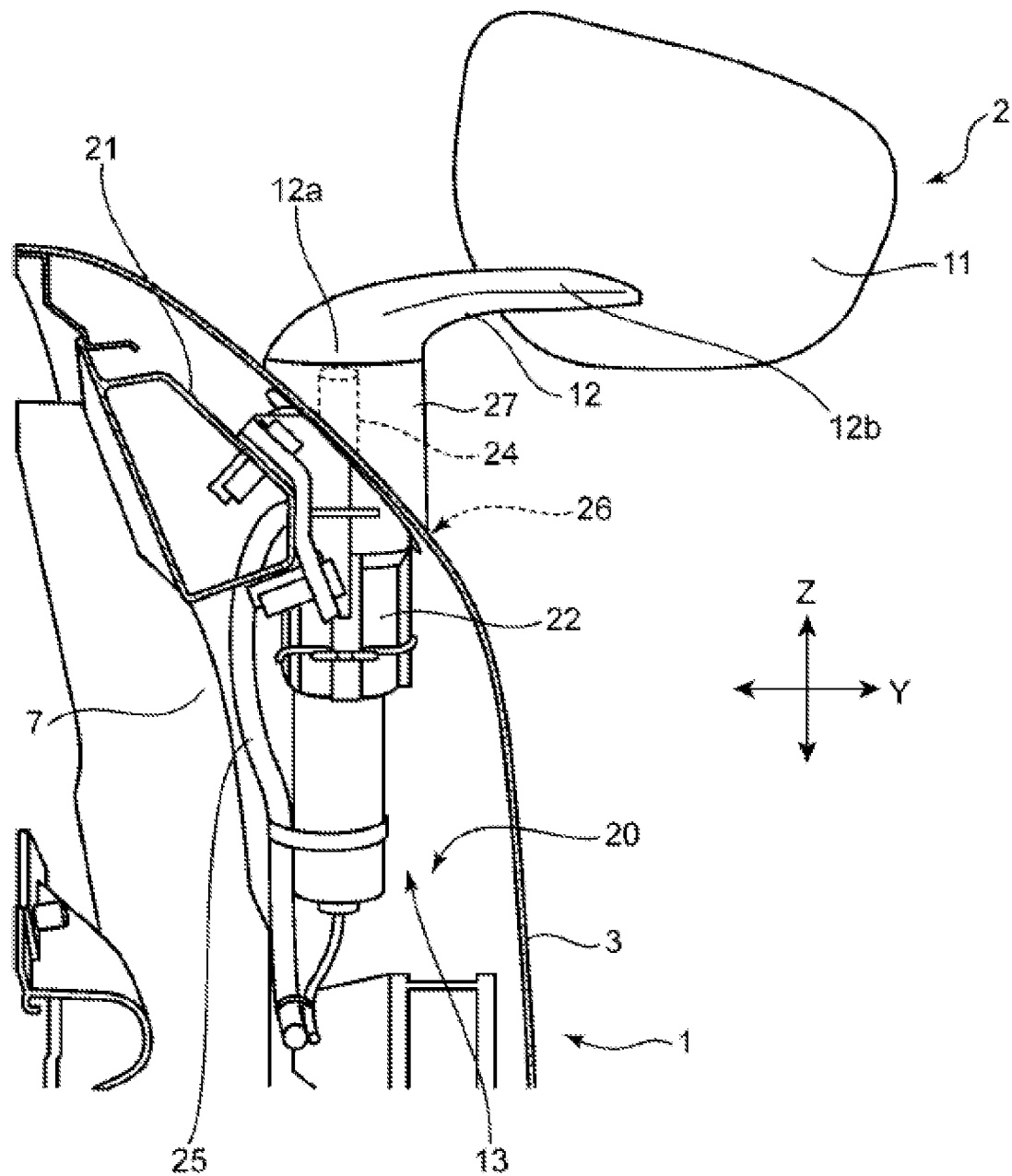
FIG. 9 is a diagram in which a cover member has been added to a sectional view taken along line X-X in FIG. 8.
Figure 10:
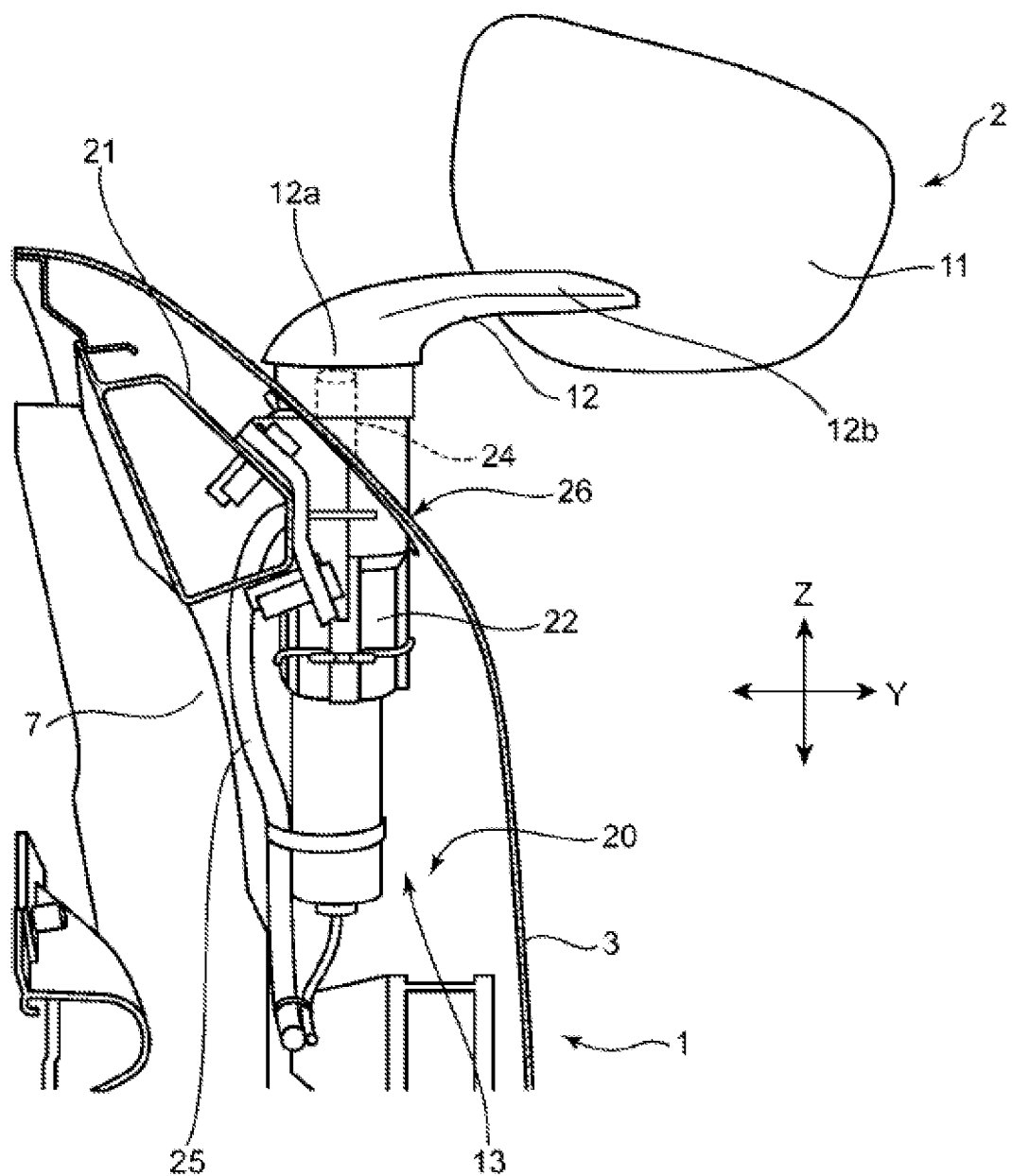
FIG. 10 is the sectional view taken along line X-X in FIG. 8.

The belt line reinforcement 21 is a frame member, provided in the side door 1, that constitutes the frame of the side door 1. As illustrated in FIG. 7, the belt line reinforcement 21 is fixed to a door inner 7 (see FIGS. 7 and 12) in the side door 1 so as to extend in a vehicle front-rear direction X along the belt line BL of the window lower edge (that is, the lower edge of a door opening 5 in which a door glass 6 is disposed) of the side door 1. The belt line reinforcement 21 of the embodiment is formed by an extruded member made of aluminum.

As illustrated in FIGS. 8 to 12, the support member 22 specifically includes a semi-cylindrical holding portion 22*a* and a pair of fixing portions 22*b* provided on both sides in the vehicle front-rear direction X of the holding portion 22*a*. The holding portion 22*a* holds the casing 31 in which the electric pivoting unit 13 and the pivot shaft 24 are housed. The pair of fixing portions 22*b* are fastened to the belt line reinforcement 21 via bolts 28.

In addition, in the embodiment, as illustrated in FIGS. 9 to 12, a harness 25 extends from the space section 20 in the side door 1 to the door mirror body unit 11 and is electrically connected to the internal device 37 (such as the mirror surface adjustment unit) in the door mirror body unit 11.

Figure 11:
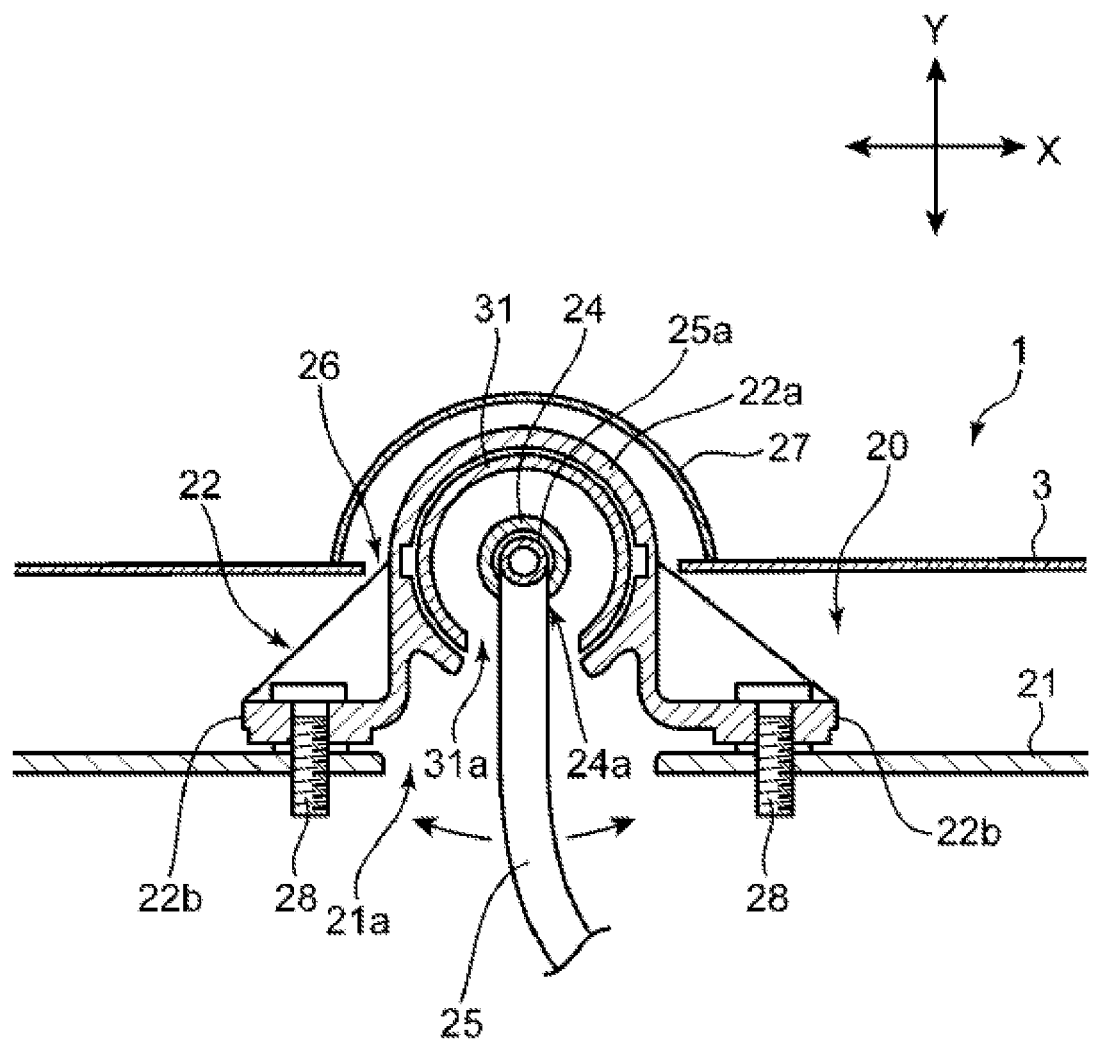
FIG. 11 is a sectional view taken along line XI-XI in FIG. 8.

Specifically, as illustrated in FIGS. 11 and 12, a first opening 21*a* is formed in a portion of the belt line reinforcement 21 that faces the holding portion 22*a* of the support member 22. In addition, a second opening 31*a* is formed in a portion of the casing 31 of the electric pivoting unit 13 that faces the first opening 21*a*. Furthermore, the pivot shaft 24 of the embodiment has a hollow cylindrical shape and a third opening 24*a* is formed in a portion of the peripheral surface thereof that faces the second opening 31*a*. Accordingly, the harness 25 passes through the first opening 21*a* of the belt line reinforcement 21, the second opening 31*a* of the casing 31, and the third opening 24*a* of the pivot shaft 24 from the inside of the side door 1 and extends to the inside of the pivot shaft 24 (see a portion 25*a* of the harness 25 that extends upward through the inside of the pivot shaft 24 in FIG. 11). Furthermore, the harness 25 extends to the internal device 37 in the door mirror body unit 11 through the insides of the pivot shaft 24 and the mirror base 12 and is electrically connected to the internal device 37.

It should be noted that, in the door mirror structure according to the embodiment, since the holding portion 22*a* of the support member 22 has a semi-cylindrical shape, even though the harness 25 is routed as described above, the casing 31 can be inserted into the holding portion 22a of the support member from above so that the harness 25 does not interfere with the holding portion 22a of the support member.

The cover member 27 covers the clearance between the through-hole 26 and the pivot shaft 24 from the vehicle outside. Specifically, as illustrated in FIGS. 9 to 12, the casing 31 of the electric pivoting unit 13 in which the pivot shaft 24 is housed and the holding portion 22a of the support member 22 that covers the casing 31 are exposed to the vehicle outside through the through-hole 26 of the door panel 3. In the lower portion of the base end portion 12a of the mirror base 12, the cover member 27 covers, from the outside, the casing 31 that houses the pivot shaft 24 and the holding portion 22a from the vehicle outside and the holding portion 22a and covers the clearance between the through-hole 26 and the holding portion 22a.

Figure 13:
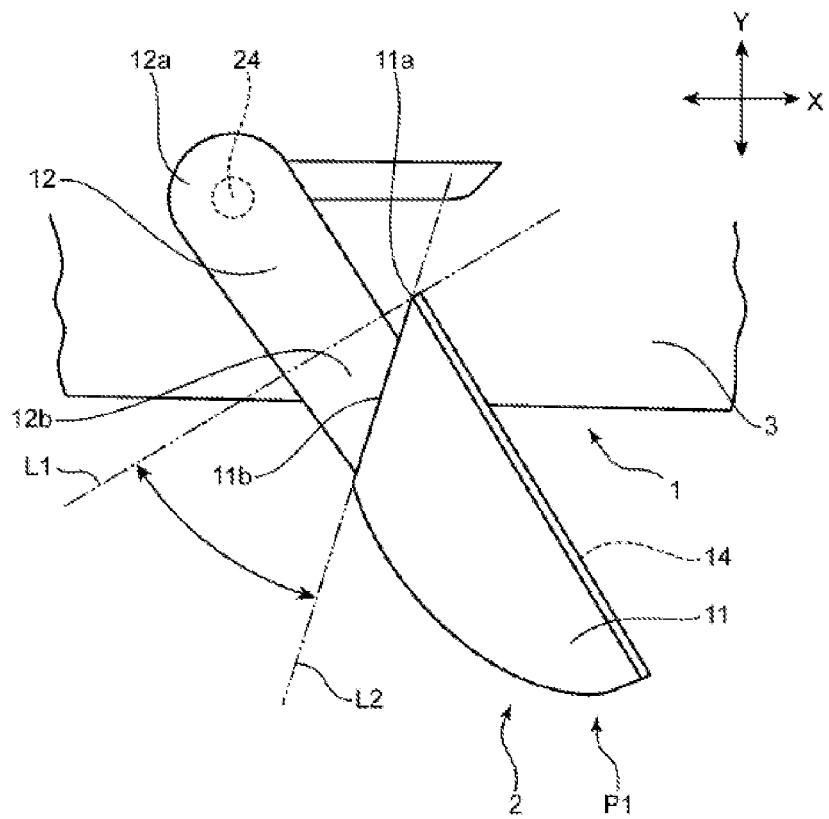
FIG. 13 is an explanatory view illustrating the state in which the inner surface of a door mirror body unit is inclined to the vehicle outside with respect to a virtual line orthogonal to the surface of the mirror in the door mirror present at the mirror use position in FIG. 3.

In addition, as illustrated in FIG. 13, to improve the visibility from the vehicle interior, when the door mirror body unit 11 is at the mirror use position P1, in plan view, the inner surface 11b of the door mirror body unit 11 that faces the side door 1 is inclined (that is, inclined so as to be away from the side door 1) to the vehicle outside with respect to the virtual line L1 that is orthogonal to the surface of the mirror 14 and passes through the inner end portion 11a of the door mirror body unit 11 close to the side door 1. That is, the inner surface 11b of the door mirror body unit 11 extends along a line L2 that starts from the inner end portion 11a of the door mirror body unit 11 and extends while being inclined to the vehicle outside with respect to the virtual line L1. In other words, when the door mirror body unit 11 illustrated in FIG. 13 is at the mirror use position P1, the thickness in the front-rear direction X of the door mirror body unit 11 becomes smaller (tapered) from the middle position in the vehicle width direction Y of the door mirror body unit 11 toward the inner end portion 11a close to the side door 1 in the vehicle width direction Y in plan view.

Figure 14:
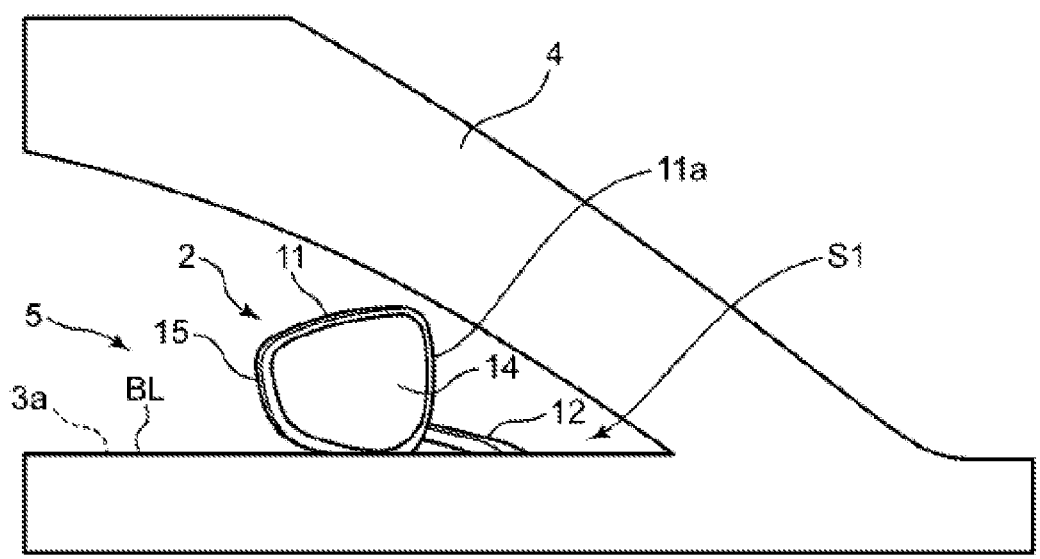
FIG. 14 is an explanatory view illustrating the state in which visibility from the vehicle interior is improved because the inner surface of the door mirror body unit is not seen from the vehicle interior in the door mirror present at the mirror use position in FIG. 3.

Since the door mirror body unit 11 has such a shape, the inner surface 11b of the door mirror body unit 11 does not block the field of view from the vehicle interior as illustrated in FIG. 14. This can obtain a wide field of view in the space S1 in front of the door mirror body unit 11, that is, the space S1 surrounded by the inner end portion 11a of the door mirror body unit 11, the A pillar 4, and the belt line BL, thereby improving the visibility.

Figure 15:
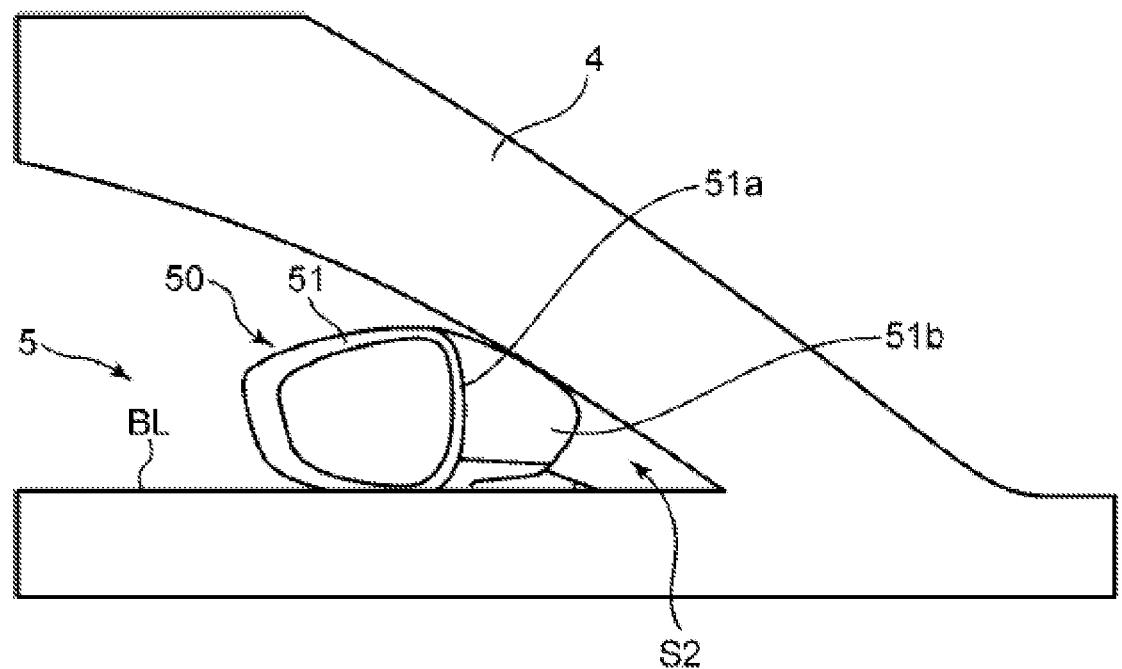
FIG. 15 is a diagram illustrating, as a comparative example of the present disclosure, the state in which the inner surface of the door mirror body unit is seen from the vehicle interior because the width in the front-rear direction of the door mirror body unit that houses an electric pivoting unit is large in the conventional door mirror, and the visibility from the vehicle interior is blocked.

For reference, since the width in the front-rear direction of the door mirror body unit 51 becomes large in the structure in which the electric pivoting unit (not illustrated) is housed in the door mirror body unit 51 as in the door mirror 50 illustrated in FIG. 15, which is a comparative example of the present disclosure, the inner surface 51b of the door mirror body unit 51 is coming into the field of view from the vehicle interior as the width in the front-rear direction increases. This narrows the field of view in the space S2 in front of the door mirror body unit 51, that is, the space S2 surrounded by the inner end portion 51a of the door mirror body unit 51, the A pillar 4, and the belt line BL, so the visibility is reduced.

Characteristics of the Embodiment (1)

In the door mirror structure according to the embodiment, the door mirror structure in the side door 1 of the vehicle includes a door mirror body unit 11 having the mirror 14 for obtaining the field of rear view of the vehicle; the mirror base 12 having the tip portion 12b fixed to the door mirror body unit 11 and the based end portion 12a away from the tip portion 12b, in which the base end portion 12a is attached to the side door 1 so that the door mirror body unit 11 and the mirror base 12 are movable between the mirror use position P1 at which the mirror 14 is visible from the vehicle interior and the retraction position P2 located on the inner side in the vehicle width direction Y of the mirror use position P1; and the electric pivoting unit 13, which is the driving unit that moves the door mirror body unit 11 and the mirror base 12 between the mirror use position P1 and the retraction position P2. The electric pivoting unit 13 is provided in the space section 20 in the side door 1 as illustrated in FIGS. 7 to 10 and FIG. 12.

In this structure, in the door mirror structure including the door mirror body unit 11 to which the mirror 14 is attached and the mirror base 12 in which the door mirror body unit 11 is fixed to the tip portion 12b, the electric pivoting unit 13 moves the mirror base 12 and the door mirror body unit 11 from the mirror use position P1 to the retraction position P2. Accordingly, when the door mirror body unit 11 and the mirror base 12 are moved to the retraction position P2, since the projection amount in the vehicle width direction Y of the door mirror body unit 11 and the mirror base 12 from the side surface of the side door 1 can be reduced and the vehicle width dimension can be minimized.

In addition, since the electric pivoting unit 13, which is a heavy object, is provided in the side door 1 in this door mirror structure, the moment in the vertical direction Z generated in the door mirror due to road input (that is, vibration and external force mainly in the vertical direction Z due to the unevenness of the road surface) during a travel of the vehicle is reduced and the vibration of the mirror can be prevented.

Furthermore, since the electric pivoting unit 13 is provided in the side door 1, the width in the front-rear direction of the door mirror body unit 11 can be reduced as compared with the conventional door mirror structure in which the electric pivoting unit 13 is housed in the door mirror body unit 11, and the visibility from the vehicle interior can be improved.

(2)

Since the electric pivoting unit 13 is provided in the side door 1 in the door mirror structure according to the embodiment, the electric pivoting unit 13 can be protected against foreign matter outside the vehicle by the side panel 3 constituting the outer surface of the side door 1. It should be noted that the electric pivoting unit 13 may be disposed outside the side door 1, but a large cover member or the like that protects the electric pivoting unit 13 is required in this case.

(3)

The door mirror structure according to the embodiment further includes the pivot shaft 24 that is coupled to the base end portion 12a of the mirror base 12 and pivotally supports the door mirror body unit 11 and the mirror base 12 between the mirror use position P1 and the retraction position P2. The pivot shaft 24 extends from the base end portion 12a into the side door 1 and is rotated by the electric pivoting unit 13.

Since this structure further includes the pivot shaft 24 that pivotally supports the door mirror body unit 11 and the mirror base 12, the door mirror body unit 11 and the mirror base 12 can be moved between the mirror use position P1 and the retraction position P2 while the door mirror body unit 11 and the mirror base 12 are pivoted about the pivot shaft 24 as the pivot center by rotating the pivot shaft 24 via the electric pivoting unit 13 in the side door 1. Accordingly, the movement of the door mirror body unit 11 and the mirror base 12 between the mirror use position P1 and the retraction position P2 can be achieved with a simple structure.

(4)

In the door mirror structure according to the embodiment, the electric pivoting unit 13 (specifically, the motor 32, the reducer 33, the torque limiter 34, and the output shaft 35, which are the main components) is disposed on the axial line of the pivot shaft 24.

Since the electric pivoting unit 13 is disposed on the axial line of the pivot shaft 24 in this structure, the structure of the power transmission system from the electric pivoting unit 13 to the pivot shaft 24 can be simple and compact. This enables the electric pivoting unit 13 to be installed in a limited space in the side door 1.

(5)

In the door mirror structure according to the embodiment, the through-hole 26 through which the pivot shaft 24 passes is formed in the door panel 3 constituting the outer surface of the side door 1. The door mirror structure further includes a cover member 27 that covers the clearance between the through-hole 26 and the pivot shaft 24 from the vehicle outside.

Since the cover member 27 covers the clearance between the through-hole 26 of the door panel 3 and the pivot shaft 24 from the vehicle outside in this structure, the appearance of the vehicle is improved and intrusion of water into the door panel 3 through the clearance can be prevented.

(6)

In the door mirror structure according to the embodiment, the electric pivoting unit 13 is fixed to the belt line reinforcement 21 that is the frame member constituting the the frame of the side door 1 provided in the side door 1.

Since the electric pivoting unit 13 is fixed to belt line reinforcement 21 as the frame member that constitutes the frame of the side door 1 in this structure, the support stiffness of the electric pivoting unit 13 is improved.

(7)

In the door mirror structure according to the embodiment, the belt line reinforcement 21 extending in the vehicle front-rear direction X along the belt line BL at the lower edge of the window of the side door 1 is adopted as the frame member.

In this structure, by fixing the electric pivoting unit 13 to the belt line reinforcement 21 generally used in the conventional door structure, the door mirror structure described above can be widely adopted in the conventional door structure.

(8)

In the door mirror structure according to the embodiment, the belt line reinforcement 21 is formed by an extruded member made of aluminum.

Since the belt line reinforcement 21 is formed by an extruded member made of aluminum in this structure, the support rigidity of the electric pivoting unit 13 can be ensured and the weight of the vehicle can be reduced.

(9)

In the door mirror structure according to the embodiment, as illustrated in FIG. 13, when the door mirror body unit 11 is at the mirror use position P1, in plan view, the inner surface 11b of the door mirror body unit 11 that faces the side door 1 is inclined to the vehicle outside with respect to the virtual line L1 that is orthogonal to the surface of the mirror 14 and passes through the inner end portion 11a of the door mirror body unit 11.

Since the inner surface 11b of the door mirror body unit 11 is inclined to the vehicle outside with respect to the virtual line L1 orthogonal to the surface of the mirror when the door mirror body unit 11 is at the mirror use position P1 in this structure, the inner surface 11b of the door mirror body unit 11 does not block the field of view from the vehicle interior. As a result, the visibility from the vehicle interior can be ensured as much as possible to further improve the visibility.

(10)

In the door mirror structure according to the embodiment, as illustrated in FIG. 13, when the door mirror body unit 11 is at the mirror use position P1, in plan view, the thickness in the front-rear direction X of the door mirror body unit 11 becomes smaller toward the inner end portion 11a of the side door 1 in the vehicle width direction Y from the middle portion in the vehicle width direction Y of the door mirror body unit 11.

Since the thickness in the front-rear direction X of the door mirror body unit 11 becomes smaller toward the inner end portion 11a in the vehicle width direction Y from the middle position in the vehicle width direction Y when the door mirror body unit 11 is at the mirror use position P1 in this structure, the inner surface 11b of the door mirror body unit 11 does not block the field of view from the vehicle interior. As a result, the visibility from the vehicle interior can be ensured as much as possible to further improve the visibility.

Modifications (A)

The driving unit according to the present disclosure only needs to move the door mirror body unit 11 and the mirror base 12 between the mirror use position P1 and the retraction position P2 and may be another driving unit instead of the electric pivoting unit described above. For example, the driving unit according to the present disclosure may be a unit driven by another driving force such as hydraulic pressure or pneumatic pressure.

(B)

In addition, although the door mirror body unit 11 and the mirror base 12 are moved between the mirror use position P1 and the retraction position P2 by being pivoted about the pivot shaft 24 as the pivot center in the embodiment described above, the door mirror body unit 11 and the mirror base 12 may be moved between the mirror use position P1 and the retraction position P2 by movement other than pivot, such as composite movement obtained by combining pivot with linear movement.

(C)

Figure 16:
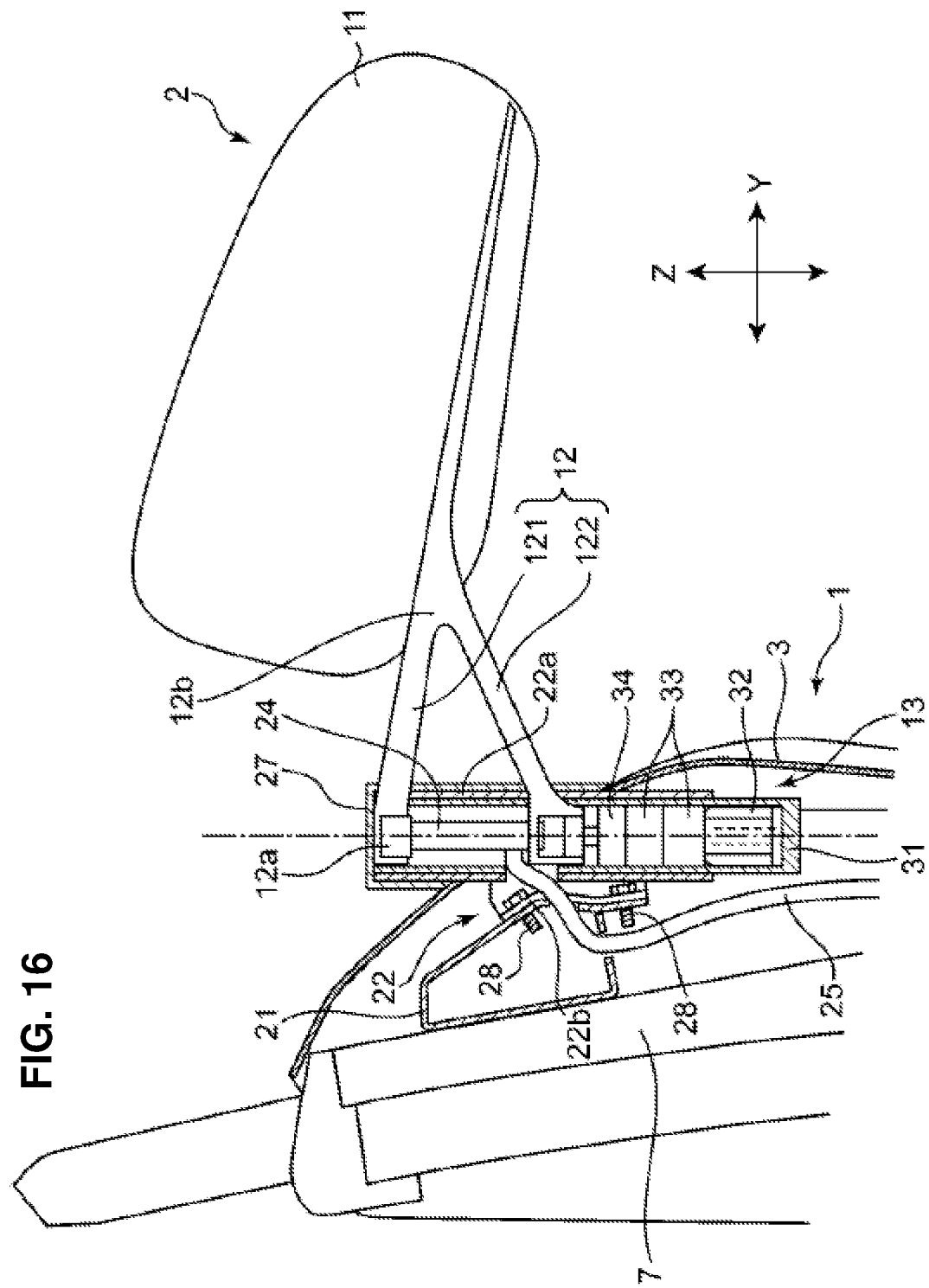
FIG. 16 is an explanatory diagram of a cross section illustrating a door mirror structure according to a modification of the present disclosure in which a mirror base is branched into two upper and lower portions in a part of the base end portion.

The mirror base 12 of the embodiment includes one arm as a portion constituting the arm portion of the door mirror 2, but the present disclosure is not limited to this example. As a modification of the present disclosure, a structure in which the mirror base 12 is branched into two upper and lower portions (an upper portion 121 and a lower portion 122) in a portion of the mirror base 12 close to the base end portion 12a, may be adapted as illustrated in FIG. 16. Since the branched upper and lower portions 121 and 122 of the mirror base 12 are coupled to the pivot shaft 24 at positions away from each other in the vertical direction Z in this structure, the support rigidity of the door mirror body unit 11 is improved and the weight of the mirror base 12 can be reduced.

(D)

The mirror of the present disclosure includes various units for obtaining the field of rear view of the vehicle. For example, in addition to the optical mirror 14 that obtains the field of rear view by reflecting the light from the vehicle rear as in the embodiment described above, a so-called digital mirror that can obtain the field of rear view using a TV camera disposed in the door mirror body unit 11 is also included in the concept of the mirror of the present disclosure.

What is claimed is:

1. A door mirror structure in a side door of a vehicle, the door mirror structure comprising:
    a door mirror body unit having a mirror for obtaining a field of rear view of the vehicle;
    a mirror base having a tip portion fixed to the door mirror body unit and a base end portion away from the tip portion wherein the base end portion is attached to the side door so that the door mirror body unit and the mirror base are movable between a mirror use position at which the mirror is visible from a vehicle interior and a retraction position located on an inner side in a vehicle width direction of the mirror use position; and
    a driving unit that moves the door mirror body unit and the mirror base between the mirror use position and the retraction position,
    wherein the driving unit is provided in the side door,
    the door mirror structure further comprises a pivot shaft coupled to the base end portion of the mirror base, the pivot shaft pivotally supporting the door mirror body unit and the mirror base between the mirror use position and the retraction position, and
    the pivot shaft extends from the base end portion into the side door, the pivot shaft being rotated by the driving unit.

2. The door mirror structure according to claim 1, wherein the driving unit is an electric pivoting unit for moving the door mirror body unit and the mirror base.

3. The door mirror structure according to claim 1, wherein the driving unit is disposed on an axial line of the pivot shaft.

4. The door mirror structure according to claim 3, further comprising:
    a cover member that covers, from a vehicle outside, a clearance between the pivot shaft and a through-hole through which the pivot shaft passes, the through-hole being formed in a door panel constituting an outer surface of the side door.

5. The door mirror structure according to claim 4, wherein the driving unit is fixed to a frame member that constitutes a frame of the side door, the frame member being provided in the side door.

6. The door mirror structure according to claim 5, wherein the frame member is a belt line reinforcement extending in a vehicle front-rear direction along a belt line at a lower edge of a window of the side door.

7. The door mirror structure according to claim 6, wherein the belt line reinforcement is formed by an extruded member made of aluminum.

8. The door mirror structure according to claim 7, wherein when the door mirror body unit is at the mirror use position, in plan view, an inner surface of the door mirror body unit that faces the side door portion is inclined to the vehicle outside with respect to a virtual line that is orthogonal to a surface of the mirror and passes through an inner end portion of the door mirror body unit close to the side door.

9. The door mirror structure according to claim 8, wherein when the door mirror body unit is at the mirror use position, in plan view, a thickness in the front-rear direction of the door mirror body unit becomes smaller toward the inner end portion in the vehicle width direction from a middle position in the vehicle width direction in the door mirror body unit.

10. The door mirror structure according to claim 1, further comprising:
    a cover member that covers, from a vehicle outside, a clearance between the pivot shaft and a through-hole through which the pivot shaft passes, the through-hole being formed in a door panel constituting an outer surface of the side door.

11. The door mirror structure according to claim 1, wherein the driving unit is fixed to a frame member that constitutes a frame of the side door, the frame member being provided in the side door.

* * * * *